US009246775B2

(12) United States Patent
Esserman et al.

(10) Patent No.: US 9,246,775 B2
(45) Date of Patent: Jan. 26, 2016

(54) SYSTEM, METHOD AND APPARATUS FOR FILTERING SUBSCRIBER NETWORK TRAFFIC

(75) Inventors: Jim Esserman, La Jolla, CA (US); Kristi Jaska, Encinitas, CA (US); Keven Lippert, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 19 days.

(21) Appl. No.: 13/592,126

(22) Filed: Aug. 22, 2012

(65) Prior Publication Data
US 2014/0059227 A1   Feb. 27, 2014

(51) Int. Cl.
*G06F 15/173* (2006.01)
*H04L 12/24* (2006.01)
*H04L 12/859* (2013.01)

(52) U.S. Cl.
CPC ........ *H04L 41/5025* (2013.01); *H04L 41/5067* (2013.01); *H04L 47/2475* (2013.01)

(58) Field of Classification Search
CPC . H04L 41/0816; H04L 41/0896; H04L 67/22; H04L 12/1432; H04L 12/1435; H04L 12/1439; G06F 11/3438
USPC ................................. 709/223, 224, 225, 226
See application file for complete search history.

(56) References Cited

U.S. PATENT DOCUMENTS

| 7,693,985 | B2 * | 4/2010 | Keohane et al. | 709/224 |
|---|---|---|---|---|
| 2007/0133603 | A1 | 6/2007 | Weaver et al. | |
| 2007/0288615 | A1 * | 12/2007 | Keohane et al. | 709/223 |
| 2011/0179186 | A1 * | 7/2011 | Li et al. | 709/231 |
| 2012/0115433 | A1 * | 5/2012 | Young et al. | 455/406 |
| 2012/0158947 | A1 * | 6/2012 | Hassan et al. | 709/224 |
| 2012/0231785 | A1 * | 9/2012 | Poon et al. | 455/423 |
| 2012/0254346 | A1 * | 10/2012 | Danforth et al. | 709/217 |
| 2013/0016667 | A1 * | 1/2013 | Blomqvist et al. | 370/329 |
| 2013/0031279 | A1 * | 1/2013 | Venugopal et al. | 710/18 |
| 2013/0210379 | A1 * | 8/2013 | Cloutier | 455/405 |

OTHER PUBLICATIONS

Cisco Systems, "Managing Peer-To-Peer Traffic with Cisco Service Control Technology", 2005, pp. 1-7.*
C Spire Wireless, "Service Agreement", https://web.archive.org/web/20120603033457/http://www.cspire.com/legal/general_landing.jsp?id=/generic/customerServiceAgreement, Jun. 3, 2012 [retrieved Dec. 4, 2013], 7 pgs.
C Spire Wireless, "Choice D Infinite", http://web.archive.org/web/20120801233716/http://www.cspire.com/shop_and_learn/plans/product_plan_details.jsp?id=prod27220101, Aug. 1, 2012 [retrieved Dec. 4, 2013], 3 pgs.

(Continued)

*Primary Examiner* — Jonathan Bui
(74) *Attorney, Agent, or Firm* — Knobbe Martens Olson & Bear LLP (57) ABSTRACT

Methods, apparatus, and systems manage use of shared network resources among subscribers to a data communication service. In some implementations, a first metric is computed representing a subscriber's utilization of the shared network resources. If the subscriber's utilization exceeds a first threshold, the subscriber's network traffic over the shared network resources may be filtered to allow use of the shared network resources only with a first set of capabilities. When the subscriber's data is filtered, their upload or download speed may be unaffected. If the subscriber's utilization exceeds a second threshold, the subscriber's data download speed may be limited. In some implementations, the second threshold is larger than the first threshold.

18 Claims, 6 Drawing Sheets

(56) References Cited

OTHER PUBLICATIONS

International Search Report and Written Opinion for PCT Application No. PCT/US2013/055852, mailed on Nov. 7, 2013, 14 pgs.

Ipoque, "Bandwidth Management Solutions for Network Operators", http://web.archive.org/web/20120430230750/http://www.ipoque.com/sites/default/files/mediafiles/documents/white-paper-bandwidth-management-operators.pdf, Apr. 30, 2012 [retrieved Dec. 4, 2013], 3 pgs.

* cited by examiner

SYSTEM, METHOD AND APPARATUS FOR FILTERING SUBSCRIBER NETWORK TRAFFIC

TECHNICAL FIELD

This disclosure relates to methods, apparatus, and systems for implementing networks. Specifically, this disclosure is related to network systems that include a plurality of subscribers that share a set of network resources.

DESCRIPTION OF THE RELATED TECHNOLOGY

A typical data communication network includes a variety of components or resources. These may include transmission lines, transmitters, receivers, antennas, routers, switches, gateways, firewalls, processors, and the like. Since these resources may require substantial expense to establish and operate, these resources are often shared by a group of subscribers. By sharing the resources of the network, each subscriber derives the benefits made possible by the collective set of network resources. By sharing those resources with other subscribers, each individual subscribers cost may be reduced to be proportional to their fractional use of the resources. Because the networking resources are shared by multiple subscribers, use by one subscriber may affect the ability of another subscriber to use those same resources. This may be particularly noticeable during time periods of high network resource utilization. A high utilization of network resources may introduce queuing delays within a network, as data must wait to be transmitted or received until resources become available.

In some environments, ensuring adequate network capacity to provide a high performance networking environment for all subscribers may be achieved by building in some degree of over capacity. For example, if a network is running at 50% capacity generally, contention for resources between subscribers is infrequent, as the idle resources provided by the overcapacity can be utilized during periods of peak usage to mitigate any temporary contention that may develop.

However, in environments where networking resources are expensive, operating a data network at overcapacity to reduce contention for network resources may be economically inefficient. A network operator who is unable to efficiently ensure proper sharing of network resources between subscribers may be at a competitive disadvantage due to the increased operating costs associated with running a network at overcapacity.

SUMMARY

The methods, apparatus, and systems described herein relate to computer systems that manage the network usage of each subscriber. One innovative aspect includes a computer implemented method of managing network utilization in a network where a plurality of subscribers to a data communication service access a set of shared network resources. The method includes computing one or more metrics indicative of an amount of a subscriber's utilization of the shared network resources, and filtering the subscriber's network traffic over the shared network resources to allow use of the shared network resources only with a first set of capabilities based at least in part on the one or more computed metrics meeting a first criteria, without substantially limiting at least one of the subscriber's data download speed or the subscriber's data upload speed.

Another innovative aspect disclosed is a computing device. The computing device includes means for computing one or more metrics indicative of an amount of a subscriber's utilization of the shared network resources, and means for filtering the subscriber's access over the shared network resources to allow use of the shared network resources only with a first set of capabilities based at least in part on the one or more computed metrics meeting a first criteria, without substantially limiting at least one of the subscriber's data download speed or the subscriber's data upload speed.

Another innovative aspect disclosed is a system for managing network utilization in a network where a plurality of subscribers to a data communication service access a set of shared network resources. The system includes a network server an application running on the network server, and configured to compute one or more metrics indicative of an amount of a subscriber's utilization of the shared network resources, and filtering the subscriber's access over the shared network resources to allow use of the shared network resources only with a first set of capabilities based at least in part on the one or more metrics meeting a first criteria, without substantially limiting at least one of the subscriber's data download speed or the subscriber's data upload speed.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Thus, the teachings are not intended to be limited to the implementations depicted solely in the figures, but instead have wide applicability as will be readily apparent to one having ordinary skill in the art.

One way of managing the use of shared network resources between subscribers is by offering a variety of data access plans for purchase by subscribers. These plans may provide varying levels of authorized network usage over a particular period of time, with the costs of the plans proportional to the amount of usage allowed under each plan. Subscribers requiring more usage may purchase plans matching their requirements but at a higher cost than plans purchased by subscribers with less demanding needs. While these plans may offer some ability to create proportionality between a subscriber's use of the shared network resources and their contribution to financing the network, some problems may arise when administering network usage in this way.

For example, some subscribers may not voluntarily abide by the usage limits defined by the data access plans they purchased. Other subscribers may unknowingly exceed their usage limits. When a subscriber exceeds their usage limits under their data access plan, a network operator must determine what course of action to take. It is possible to reduce a subscriber's access speed when their usage exceeds limits defined by their data access plan. It is also possible to cut off usage entirely, perhaps when a subscriber grossly exceeds their plan limits. Another option is to simply charge the subscriber for any excess overage, sometimes at substantially higher proportional cost for the data that is deemed to be over their data access plan limits.

These measures may have some disadvantages. For example, reducing a subscriber's network access speed or blocking their usage entirely may be a significant source of dissatisfaction for some subscribers, especially those subscribers who use their network access to perform important functions. Reduced or blocked usage of the network may be unacceptable for commercial subscribers for example. Similarly, automatic additional charges may be problematic for some subscribers. Charging subscriber's additional money for exceeding data access plan limits may provide some mitigation of the incremental costs associated with exceed use. However, during periods of network congestion, additional automatic charges may not mitigate the performance impact to all subscribers caused by the congestion.

Disclosed herein is another method of managing the network utilization of a plurality of subscribers that access a data communication service that includes a set of shared network resources. The method manages a subscriber's use of the shared network resources using at least three tiers of network access policy. The tier of network access policy applied for each subscriber is determined based at least in part on the subscriber's utilization of the shared network resources relative to one or more criteria.

When a subscriber's utilization of the shared network resources is within limits defined by the subscriber's network data access plan, the subscriber may have a "tier 1" access policy applied to their use of the shared network resources. In some implementations, a "tier 1" policy provides virtually unrestricted network access. With this tier, a subscriber may access any network capabilities permitted by a general network access policy provided by the network provider. While network access in this tier may be characterized as "unrestricted," even an unrestricted policy may include some restrictions. For example, a subscriber's access to network capabilities may be broadly allowed when their network usage qualifies them for a tier 1 access policy, but they may still not be allowed to access certain illegal or malicious network sites or applications.

When a subscriber's utilization of the shared network resources meets a first criteria indicating network utilization exceeds one or more limits defined in the subscriber's network data access plan, a "tier 2" network access policy may be applied to the subscriber's network traffic. When this tier is applied to a subscriber's network traffic, one or more sets of network capabilities may be filtered such that only data associated with a first set of capabilities is allowed to pass between the network and the subscriber.

A "capability" or "network capability" as used herein, may be defined by any function that uses shared network resources which can be performed on a subscriber computer. A network capability may include use of one or more network applications, network protocols, and/or network ports. A network capability may also be defined by an ability to access a particular category of network content. For example, network content may be categorized into one or more content categories such as sports, news, entertainment, streaming, instant messaging, malicious, and the like. A capability may define an ability to access content included in one or more content categories. For example, one capability may be an ability to access sports content. Another capability may be an ability to access news content.

A capability may also specify a website or destination from which access to another site originates. For example, a subscriber may access a first website, which then may access a second website or destination. A capability may specify both which first websites and which second websites the subscriber is allowed to access. For example, when accessing a particular first web site, access to content categorized as streaming and initiated as part of accessing the first web site may be defined as a capability. This capability may then be selectively authorized or unauthorized as part of a network policy. Access to streaming sites performed without accessing the first website may be considered a second capability and be selectively authorized by the network access policy. As another example, access to a particular first set of instant messaging applications from within a second set of network applications may be considered a capability, and may be authorized or not authorized by a network access policy. Access to a third set of ecommerce applications from within the second set of network applications may also be considered a capability, and may be separately authorized or not authorized by a network access policy.

When the usage level meets the first criteria, at least one of, the subscriber's data download or data upload speeds may remain at substantially full speed or not be substantially limited. As used herein, a data download or upload speed that is "not substantially limited" means a data download or upload speed that has no noticeable change in use from a tier 1 access where the user is within the limits of their network data access plan.

In some implementations, network applications that utilize a relatively larger amount of shared network resources may be blocked by a filter of a second tier policy. For example, use of streaming applications are candidates for limiting, or blocking by the filter of a second tier policy, as their relatively large utilization of shared network resources may significantly effect network utilization. These protocols may include HLS, RTMP, RTSP, RTP and MMSH. Other applications may also be limited or blocked by a tier 2 policy. For example, file transfer applications such as FTP may also be limited or blocked by a second tier policy. Other file transfer protocols that may be limited or blocked by a second tier policy include BitTorrent®, SAFT, scp, hftp, ftam, and rsync. Peer to peer sharing applications may also be limited. For example, applications such as μTorrent®, SoulSeek®, DC++®, Vuze®, Limewire®, eMule, Shareaza®, BitComet®, or Gift® may be limited. Real time entertainment applications may also be limited by a tier two policy. Real-time entertainment applications may include at least video and audio streaming applications. Photo and video sharing applications may also be limited. These may include applications such as YouTube®, Picasa®, or Instra.am®. File sharing applications such as DropBox® may also be limited.

Network administrators for the shared network resources will maintain the flexibility to limit or block additional capabilities, to include network applications, protocols, network ports, or access to particular categories of network content as part of a tier 2 policy as the internet continues to evolve.

While it may be desirable to restrict network capabilities with a propensity for high network utilization in a second tier policy, second tier policies are not limited to filtering, limiting, or blocking network capabilities with a particular network usage profile. Instead, inclusion or exclusion of a particular network capability in a second tier policy may be determined by the network provider at their discretion.

In some implementations, all network capabilities except an ability to utilize one or more selected network capabilities, including, for example, one or more of email applications, social networking, instant messaging, voice over IP (VOIP) and web browsing applications may be filtered or blocked in a second tier policy. By allowing a subscriber to continue to use email and web browsing after their utilization has exceeded the first threshold, a network provider may enable a subscriber to continue to make productive use of their network connectivity. This may be especially important to subscribers who use their network connectivity for important functions. For example, commercial subscribers may especially appreciate the flexibility shown by providers that apply this policy.

Providers implementing this tier 2 policy also may accomplish a substantial reduction in the amount of shared network resources consumed by the subscriber. This reduction in consumption may more closely align a provider's network utilization with the network data access plans sold to their subscribers.

When a subscriber's utilization of shared network resources meets a second criteria indicating additional undesired utilization by the subscriber, a "tier 3" policy may be applied to the subscriber. The third tier of policy may reduce either one or both of a subscriber's download and upload speed. This will further reduce the shared network resources consumed by this subscriber. In some implementations, the subscriber's data download speed may be limited to a first predefined percentage of the subscriber's full data download speed. For example, in some implementations the first predefined percentage may be any suitable value, for example, ten (10) percent. Similarly, in some implementations, the subscriber's data upload speed may be limited to a second predefined percentage of the subscriber's full data upload speed. For example, in some implementations the second predefined percentage may be any suitable value, for example, ten (10) percent. As used herein, a "full" data download or upload speed may be defined as not noticeably different from the download or upload speed experienced by a subscriber when they are using the shared network resources under a tier 1 policy.

In some implementations, the subscriber's use of the shared network resources may be most restricted when a third tier policy is applied. Note that while the preceding disclosure describes three tiers of policy, the methods, apparatus, and systems are not limited to those implementing exactly three policy tiers. For example, some implementations may implement four, five or six tiers of policy, with corresponding usage criteria delineating levels of policy.

Additionally, the three policy tiers described above represent a simplified implementation, and are intended to represent tiers of policy experienced by one or more users of the shared network resources. However, other policies not described here may be applied to some portion of the users of the shared network resources. Moreover, some implementations may apply access policies that differ across users with identical network utilizations and network data access plans.

Furthermore, a subscriber's network policy may differ in a manner not described here without departing from the spirit of the methods, apparatus, and systems disclosed. For example, one user may never be able to access sports oriented web sites while another user may be able to access these sites. A second user may never be able to access streaming web sites. Both the first and second users of this example may still be considered to have a "tier 1" access policy when their utilization is consistent with their plan. When their utilization meets the first criteria, the methods, apparatus, or systems disclosed may place additional restrictions on the set of applications accessed to implement a tier 2 policy.

Some implementations have one or more of the following potential advantages. Because the disclosed methods may provide a tiered approach to the management of shared network resources, a subscriber may be provided with an opportunity to adjust either their network usage or their network data access plan before significant and potentially productivity reducing restrictions are placed in effect.

For example, when a subscriber notices that their network access is being filtered, for example because their network usage meets a first criteria, they may recognize the need to upgrade their network access plan to better match their actual use of the shared network resources. Such an upgrade may provide additional revenue to the network provider. When the subscriber upgrades their network data access plan, the first criteria applied to a set of one or more network utilization metrics may be modified. For example the first criteria may be modified to indicate a higher level of allowed usage.

Alternatively, the subscriber may recognize the need to voluntarily reduce their utilization of the shared network resources. This change in behavior may reduce the overall network utilization of the shared network resources. This may enable the network services provider to support more customers than would be possible without the disclosed method of managing the access to shared network resources. This may also increase revenue for the network services provider.

If a subscriber does not upgrade their network data access plan or reduce their usage, the network provider still may benefit from use of the disclosed methods, apparatus, and systems. By filtering one or more sets of network capabilities when the subscriber's usage meets the first criteria as described above, the subscriber's use of the shared network resources is limited to only those network capabilities that are permitted by the network provider. This limiting of the subscriber's network applications may reduce the overall utilization of the shared network resources. As described above, reduced network utilization may have potential advantages for the network provider.

Furthermore, because the network provider may not substantially reduce at least one of the data download speed or upload speed when the subscriber's network utilization meets a first criteria (e.g. when the tier 2 policy is applied), the network performance of the remaining network capabilities is preserved. For example, in some implementations, a subscriber may be able to use web browsing, voice over IP, or email at a normal speed, even after their usage meets the first criteria, although their use of the shared network resources may be filtered. This can produce a significant enhancement to customer satisfaction, because some of the most commonly used applications that do not require downloads of large amounts of data (web browsing, email, and the like) can still be used at full speed, producing a better user experience for those users that occasionally exceed their data access plan but are not repeated or excessive offenders. These users can be temporarily restricted from data intensive capabilities, but can still use the shared network resources for less data intensive capabilities without penalty.

Figure 1:
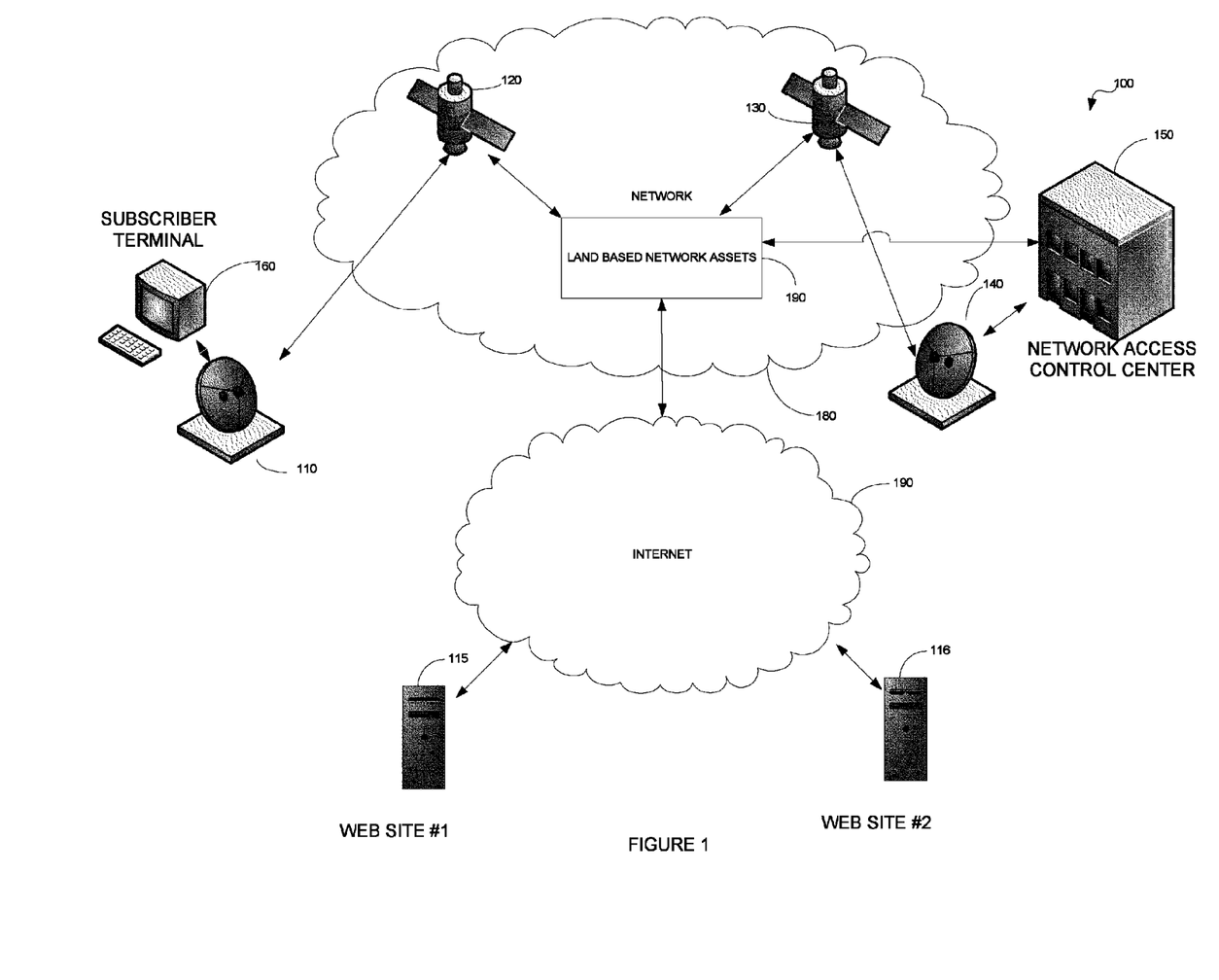
FIG. 1 illustrates a data communication service that includes the Internet, a subscriber terminal and shared network resources.

FIG. 1 illustrates a data communication system 100 including shared network resources 180. Subscribers may use network system 100 to send and receive data with other subscribers (not shown) or other non-subscribing nodes of network 100, such as web site #1 115 or web site #2 116. The illustrated data communication system includes at least two networks, the Internet 190 and the shared network resources 180. The shared network resources 180 may be a private network operated by a private entity. In some implementations, the network 180 may be partially or wholly operated by a public entity. For example, some or all of shared network resources 180 may be a military, educational, or government network. Network 180 may utilize one or more satellites 120 and 130 (which may be the same satellite). Satellite 120 sends and receives data to a data uplink and downlink transceiver 110 to provide data communication services to a subscriber via subscriber terminal 160. Satellite 120 may also send data to other network assets 190. These network assets 190 may include land based network assets, and may include switches, routers, transmission lines, base stations, web servers, file servers, and the like, none of which are shown. Network 180 may also include additional satellites, and uplink and downlink transceivers.

In many advantageous implementations, the shared network resources 180 are operated by an Internet service provider (ISP) and the network 190 includes the public Internet. In these implementations, multiple subscribers may be using the shared network resources 180 to send and receive data from servers connected to the public Internet such as servers 115 and 116 of FIG. 1. As described above, the simultaneous use of the network resources 180 by multiple subscribers to access information on the public Internet can lead to the cost, congestion, and customer satisfaction issues described above.

A network access control center 150 may include systems and apparatus to monitor and manage the shared networking resources or network 180. Satellite 130 may send and receive data to and from uplink/downlink transceiver 140, which may send and receive data to and from network access control center 150. For example, network access control center 150 may determine an amount of congestion of the shared network resources illustrated in FIG. 1. Additionally, network access control center 150 may determine an individual subscriber's utilization of the shared network resources 180 illustrated in FIG. 1. The network access control center is illustrated as a separate site in FIG. 1. It will be appreciated, however, that no specific location is to be implied, and the network access control center is essentially another group of network assets that are part of and/or connected to the network 180 which include certain management functionality, some aspects of which are described in further detail below.

Figure 2:
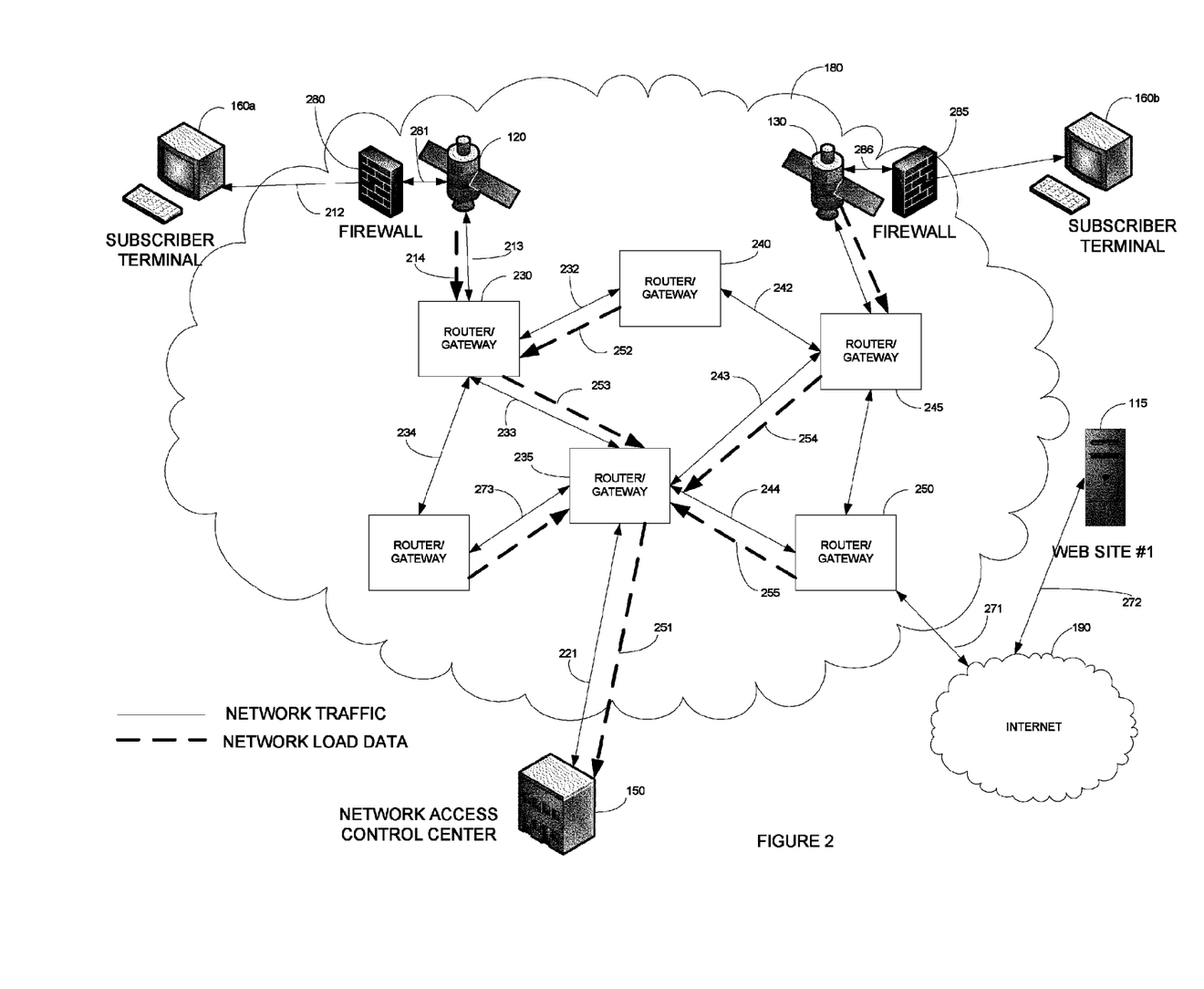
FIG. 2 shows the communication of network traffic and network statistics data between a plurality of router/gateway devices.

FIG. 2 shows the communication of network traffic and network statistics data between a plurality of router/gateway devices and network access control center 150. A subscriber may use terminal 160a to send and receive data over a network. A network 180 may include, among other components, a plurality of router/gateway devices that communicate with each other to route network traffic to its destination. For example, data transmitted from subscriber terminal 160a to web site #1 115 may first traverse link 212 to firewall 280. The data may then be sent to satellite 120, then to router/gateway 230 over link 213, then over link 233 to router/gateway 235, then link 244 to router gateway 250, and then to the Internet over link 271. The data then reaches web site #1 over link 272.

Some implementations may have a single gateway that routes traffic between at least a first node and a second node. In these implementations, both satellites 120 and 130 may be in communication with a single gateway, for example, router/gateway 230. Communication between a subscriber terminal, such as subscriber terminal 160a, and a web site, such as web site #1 in FIG. 2, would only traverse one gateway when moving from their source to their destination.

The router/gateway devices may also include network monitoring capabilities that maintain statistics representing their utilization and the utilization of the links to which they are attached. For example, router/gateway 230 may measure its utilization as well as the utilization of links 213, 232, 233, and 234. The statistics generated by the router/gateways representing the utilization of links and the routers/gateways may be sent to the network access control center 150 using the links and router/gateway devices of the network. The flow of this statistical information through the network is illustrated via the dashed arrows of FIG. 2. For example, utilization statistics of router/gateway 240 may be sent over link 232. This is shown as statistics flow 252. The statistics may then be sent to router/gateway 235 via link 233. This is shown as statistics flow 253. Note that statistics flow 253 may include statistics from router/gateway 240 and router/gateway 230. For example, router/gateway 230 may determine its utilization, and the utilization of links 232, 213, 233, and 234 to create utilization statistics. These statistics may then also be sent over link 233 to router/gateway 235. This is shown as statistics flow 253. Therefore, statistics flow 253 may include utilization statistics generated by router/gateway 240 and utilization statistics generated by router/gateway 230.

Router/Gateways 245 and 250 may also send utilization statistics over links 243 and 244 respectively. This is represented as statistics flow 254 and 255 respectively. These statistics may also be received by router/gateway 235.

When statistics arrive at router/gateway 235, they may then be sent to the network access control center 150 over link 221. This is represented as statistics flow 251. Note that router gateway 235 may also determine utilization statistics for itself, and links 273, 221, 243, 244, and 233. This information may also be part of statistics flow 251.

As described, one or more network servers within the network access control center 150 (not shown) may receive utilization statistics from one or more network components as described above. In some embodiments, these statistics may be aggregated partially by devices within the network, such as the router/gateways illustrated in FIG. 2. For example, in some implementations, when router/gateway 230 receives usage statistics from router gateway 240 over statistics flow 252, router/gateway 230 may aggregate the statistics from statistics flow 252 with its own statistics, and then forward the statistics to router/gateway 235. In some implementations, the statistics may be at least partially aggregated also by one or more network servers within the network access control center 150. By aggregating the statistics from within the network, network access control center 150 may establish the current overall utilization of the network.

Network components within the network may also maintain statistics on a specific individual subscriber's use of the network services offered by the network provider. For example, a router/gateway may determine the amount of data sent to or received by each subscriber. These individual subscriber statistics may also be sent to network access control center 150 by components of the network in a method similar to that described above. Network access control center may then aggregate statistics for each subscriber based on information it receives from the components of the network. For example, one or more network servers running in the network access control center 150 may receive and aggregate statistics for each subscriber.

Network access control center may provide control of firewalls 280 and 285. For example, based on statistical information provided as described above, one or more network servers in the network control center may configure firewall 285 with a policy that filters one or more sets of network capabilities used by subscriber terminal 160a. Similarly, network control center may also configure firewall 285 with a policy to filter network capabilities used by subscriber terminal 160b. Network access control center 150 may also configure firewall 280 or firewall 285 to permit all network capabilities based on the statistical information it receives on usage of a subscriber or based on congestion of the shared network resources generally.

The network access control center 150 may also configure firewalls 280 or 285 with policies that restrict the data download or upload speed for subscriber terminals 160a or 160b.

While firewalls 280 and 285 are illustrated in FIG. 2 as separate from subscriber terminals 160a-b and satellites 120 and 130, in some implementations, a firewall may be integrated into hardware included in satellite 120 or 130. In other implementations, the firewall may be integrated into a device located proximate to the subscriber terminal 160a or 160b. For example, the firewall may be embedded or integrated with an uplink or download transmitter or receiver located at the physical location of the subscriber terminal or proximate to it. Other implementations may locate firewalls deeper within network 180. For example, in some implementations the firewalls may be located between a satellite such as satellite 120 and a router gateway such as router gateway 230. In some implementations, it may be preferable to locate a firewall such as firewalls 280 or 285 as close to the source of network traffic as possible. For example, by locating a firewall close to a subscriber, filtering, limiting or blocking of network traffic sent by that subscriber may be performed without consuming downstream shared network resources. This may provide for more efficient filtering of subscriber traffic in some implementations.

Shared network resources 180 may also enable the exchange of network data between subscriber terminals 160a-b and the network access control center 150. For example, one or more network servers within the network access control center 150 (not shown) may send data to or receive data from at least one of subscriber terminals 160a-b.

Figure 3:
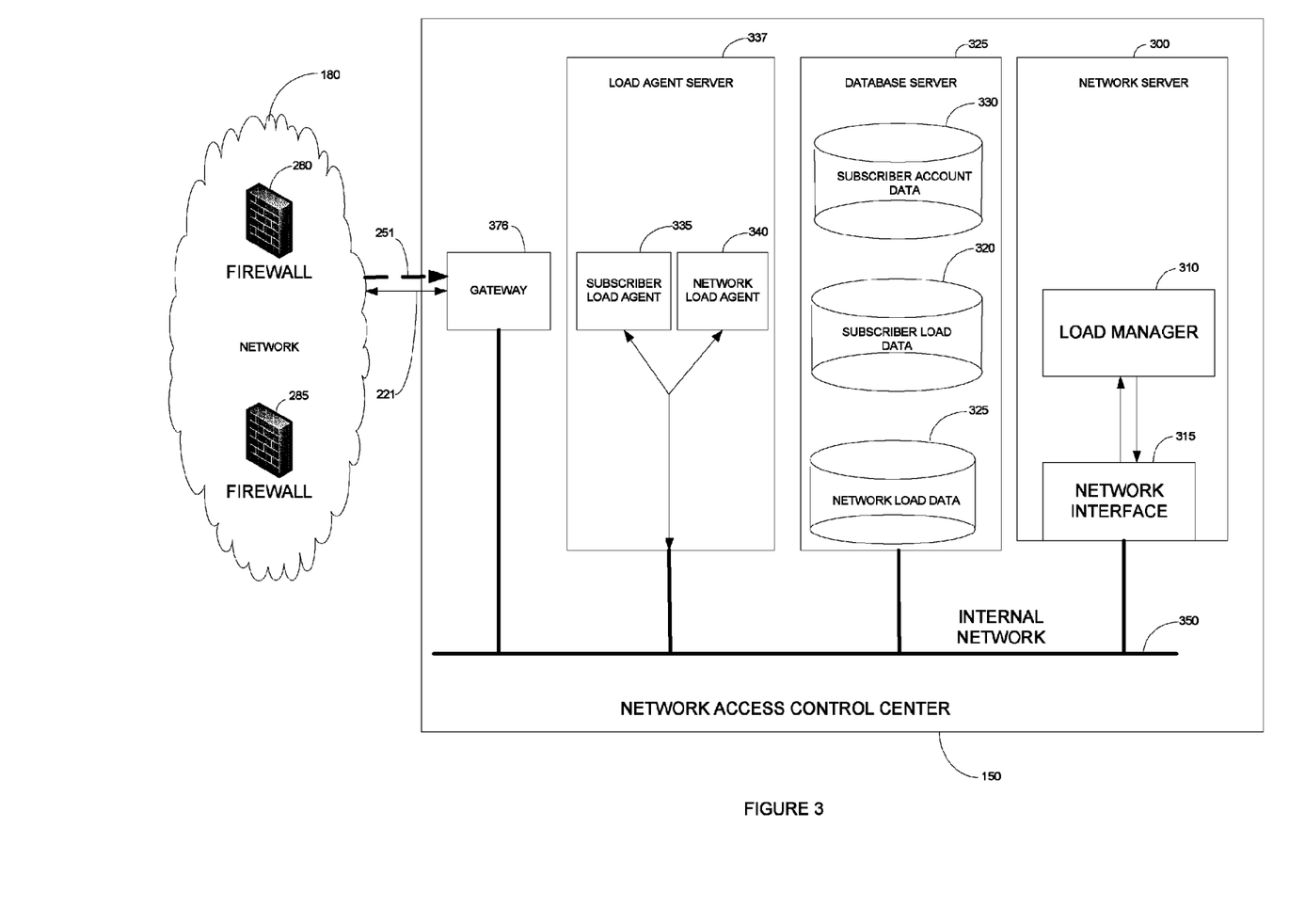
FIG. 3 is a block diagram of a system within a network access control center implementing at least one of the operative embodiments.

FIG. 3 is a block diagram of a system within a network access control center 150 as illustrated in FIG. 2. The system may implement at least one of the operative embodiments. Network access control center 150 receives statistics flow 251 from network 180 over link 221 as described in FIG. 2. Gateway 376 within network access control center receives the statistics and forwards them onto internal network 350. Statistics flow 251 is sent to subscriber load agent 335 and network load agent 340 via internal network 350. Subscriber load agent 335 may identify subscriber specific load information from statistics flow 251 and write the identified information to subscriber load data database 320 using internal network 350. Similarly, network load agent 340 may identify network load information in statistics flow 251 and write the identified information into network load data database 325, also using internal network 350.

Network server 300 may include a load manager module 310 that manages the load of the shared network resources of network 180. Load manager module 310 may be included in host program 410, illustrated in FIG. 4, discussed below. Load manager module 310 may receive data from database server 325. For example, load manager module 310 may retrieve subscriber load data from subscriber load data database 320. Load manager may also receive subscriber account data from subscriber account data database 330. Using this information, load manager 310 may set a policy for a firewall to filter network traffic for one or more subscribers. For example, load manager may configure firewall 280 or firewall 285 to selectively filter a subscriber's network traffic. Load manager 310 may communicate with firewall 280 or firewall 285 over a communication path defined by internal network 350, gateway 376, links 251 and 221, and network 180.

In some implementations, the shared network resources 180 will be configured so as to route each subscriber's network traffic through at least one firewall. These firewalls may be under the control of a load manager, such as load manager 310. A load manager may configure the firewall to selectively filter network traffic for each subscriber based on the subscriber's usage statistics. These usage statistics may include the subscriber's utilization of shared network resources. The load manager may also configure the firewall to selectively filter network traffic for each subscriber based on network usage statistics, such as an amount of congestion of the shared network resources.

Note that while network server 300 is illustrated as being located inside a network access control center 150, the location of network server 300 is not relevant to the operation of the methods, apparatus, and systems disclosed. Instead, network server 300 may be located anywhere that provides network connectivity to firewalls that may filter the network traffic of a subscriber of network 180. Load manager 310 may also have network connectivity with a database server such as database server 325, so as to obtain information on the network utilization of network 180.

Furthermore, although the components of network control center are illustrated as including a gateway 376, load agent server 337, database server 325, and network server 300, it is understood that the illustrated architecture of components in FIG. 3 is merely illustrative, and many different hardware and software architectures are possible without departing from the methods, apparatus, and systems described herein. For example, the databases illustrated on database server 325 could instead be hosted directly on network server 300. Similarly, the load agent server 337 could be combined with database server 325 or network server 300. Alternatively, load agent 335 and 340 could be deployed on separate servers. Furthermore, the illustrated structure of servers should not imply a particular hardware structure. For example, the load agent server 337, database server 325, and network server 300 could be virtualized such that they all run on one server or on any combination or number of physical servers.

Figure 4:
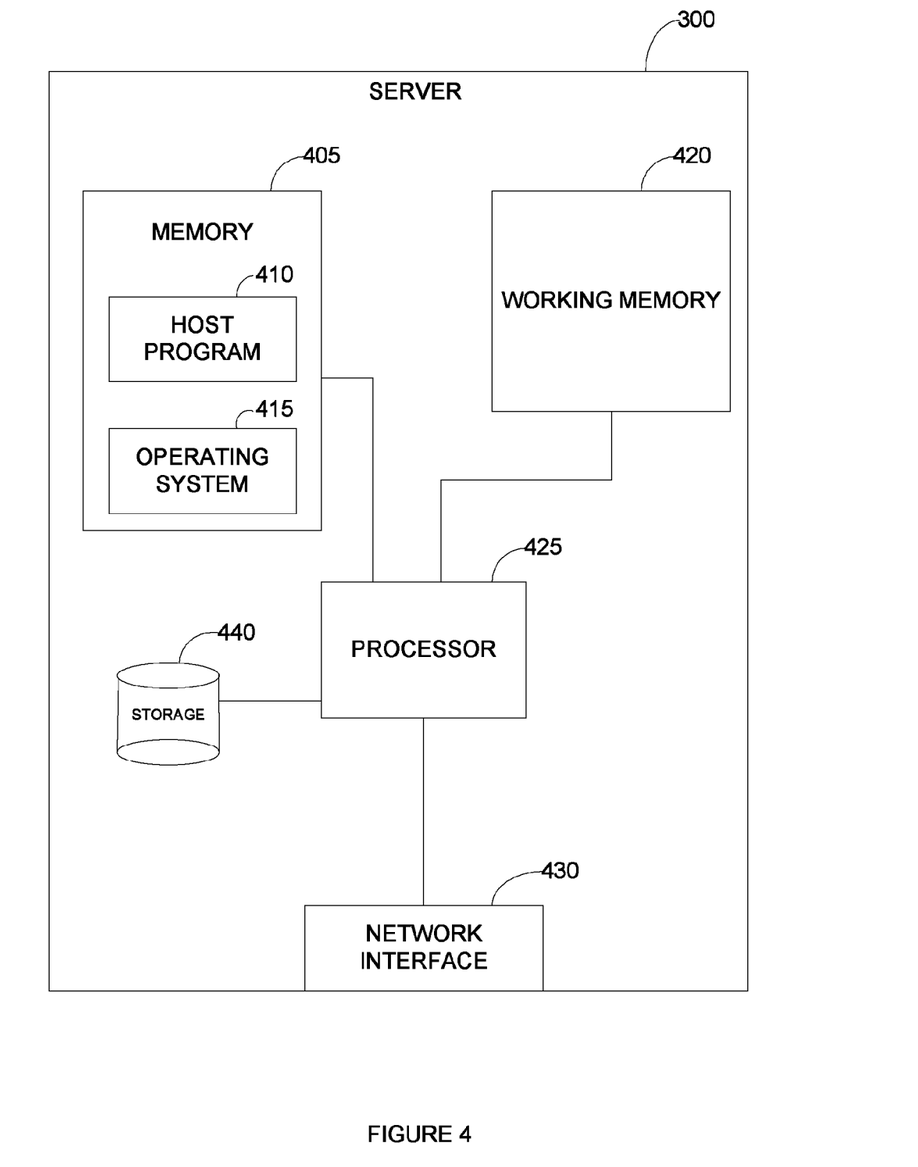
FIG. 4 is a block diagram of a server implementing one of the operative embodiments.

FIG. 4 is a block diagram of a network server apparatus implementing at least one operative embodiment. The network server 300 may be equivalent to the network server 300 illustrated inside network access control center 150 in FIG. 3. In these implementations, the network server 300 of FIG. 3 may include components as illustrated in the block diagram of FIG. 4. Server 300 includes a processor 425 that is operatively coupled to a memory 405. Memory 405 includes modules that include instructions that configure processor 425 to perform functions of server 300. For example, memory 405 is illustrated as including a host program 410 and an operating system 415.

Processor 425 is also operatively coupled to a working memory 420. In some implementations, working memory 420 may store, at least temporarily, dynamic data needed to perform the operations of server 300. For example, in some implementations, instructions from host program 410 or operating system 415 may be loaded into working memory 420 before being executed by processor 425. In some implementations, working memory 420 may maintain run time data generated by instructions included in host program 410 or operating system 415.

Process 425 is also operatively coupled to network interface 430. Instructions in host program 410 or operating system 415 may configure processor 425 to send or receive data over network interface 430. Process 425 may also be operatively coupled to a storage 440. While FIG. 4 illustrates storage 440 as a traditional disk device, storage 440 may include any number of stable storage forms including a hard disk, floppy disk, ram drive, or the like.

Figure 5:
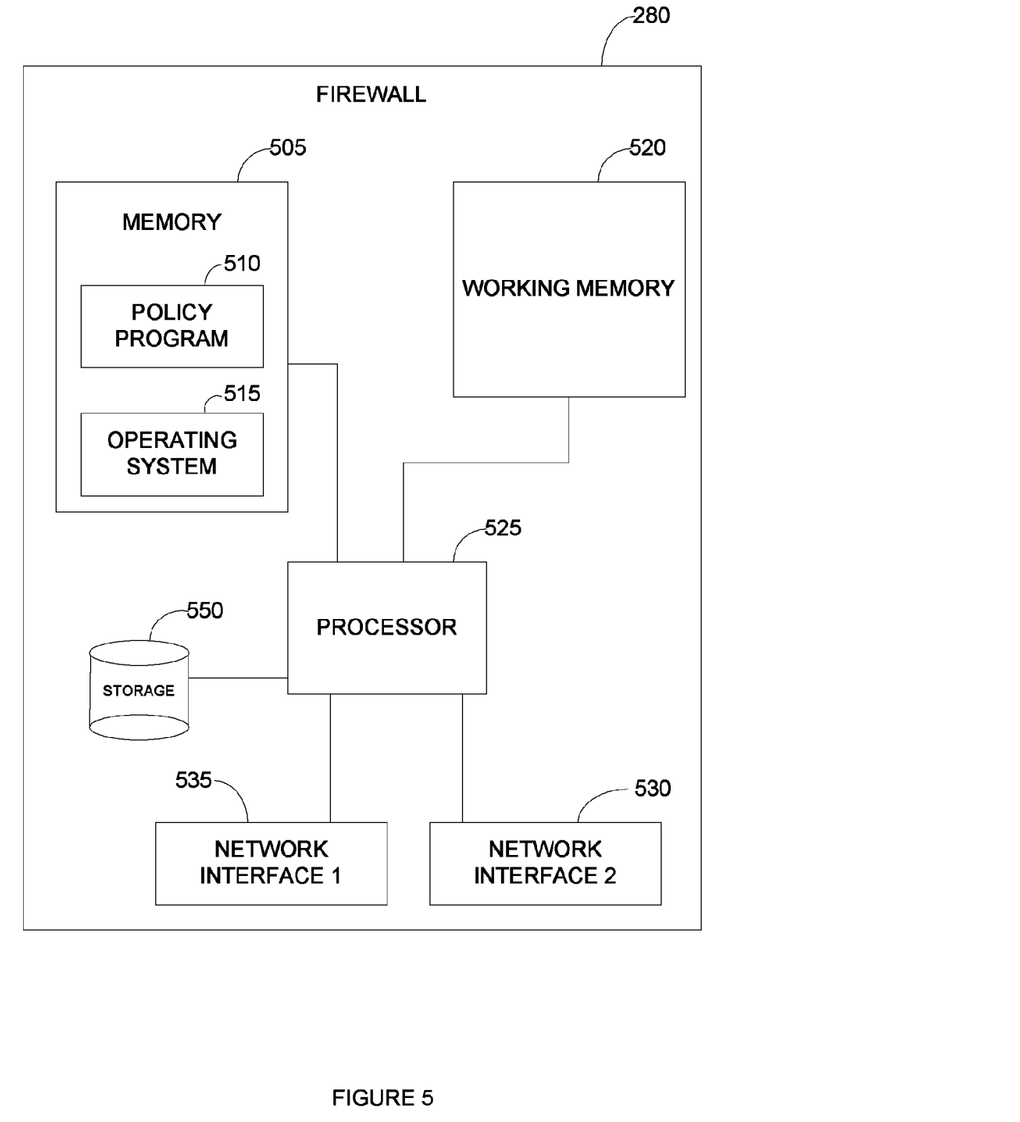
FIG. 5 is a block diagram of a firewall implementing one of the operative embodiments

FIG. 5 is a block diagram of a firewall implementing at least one of the operative embodiments. Firewall 280 is illustrated with a processor 525 which is operatively connected to a memory 505, working memory 520, storage 550, network interface 1 535 and network interface 2 530.

Memory 505 stores modules that include instructions that configure processor 525 to perform functions of firewall 280. For example, memory 505 is illustrated as storing a policy program 510 and an operating system 515. Operating system 515 may include instructions that configure processor 525 to manage the computing resources of firewall 280.

Policy program 510 may include instructions that configure processor 525 to receive and enforce network policies. For example, policy program 510 may receive policies from a load manager, such as load manager 310 illustrated in FIG. 3. These policies may define how the firewall 280 should manage network packets received over network interface 1 or network interface 2.

For example, policy program 510 may specify that certain firewall actions are performed by firewall 280 when packets are received that match a specified criteria. These criteria may include packet header or data values within a certain range or meeting a certain value. If the criteria for a particular policy match a packet received by firewall 280, the policy's firewall actions may be applied to the packet.

If a received packet matches a policy criteria that species the firewall should allow the packet to pass through the firewall, policy program 510 may forward the packet. For example, if the packet was received over network interface 1, allowed packets may be forwarded on network interface 2. However, if the packet matches a policy criteria that specifies a firewall action of blocking the packet, the packet may not be forwarded.

Figure 6:
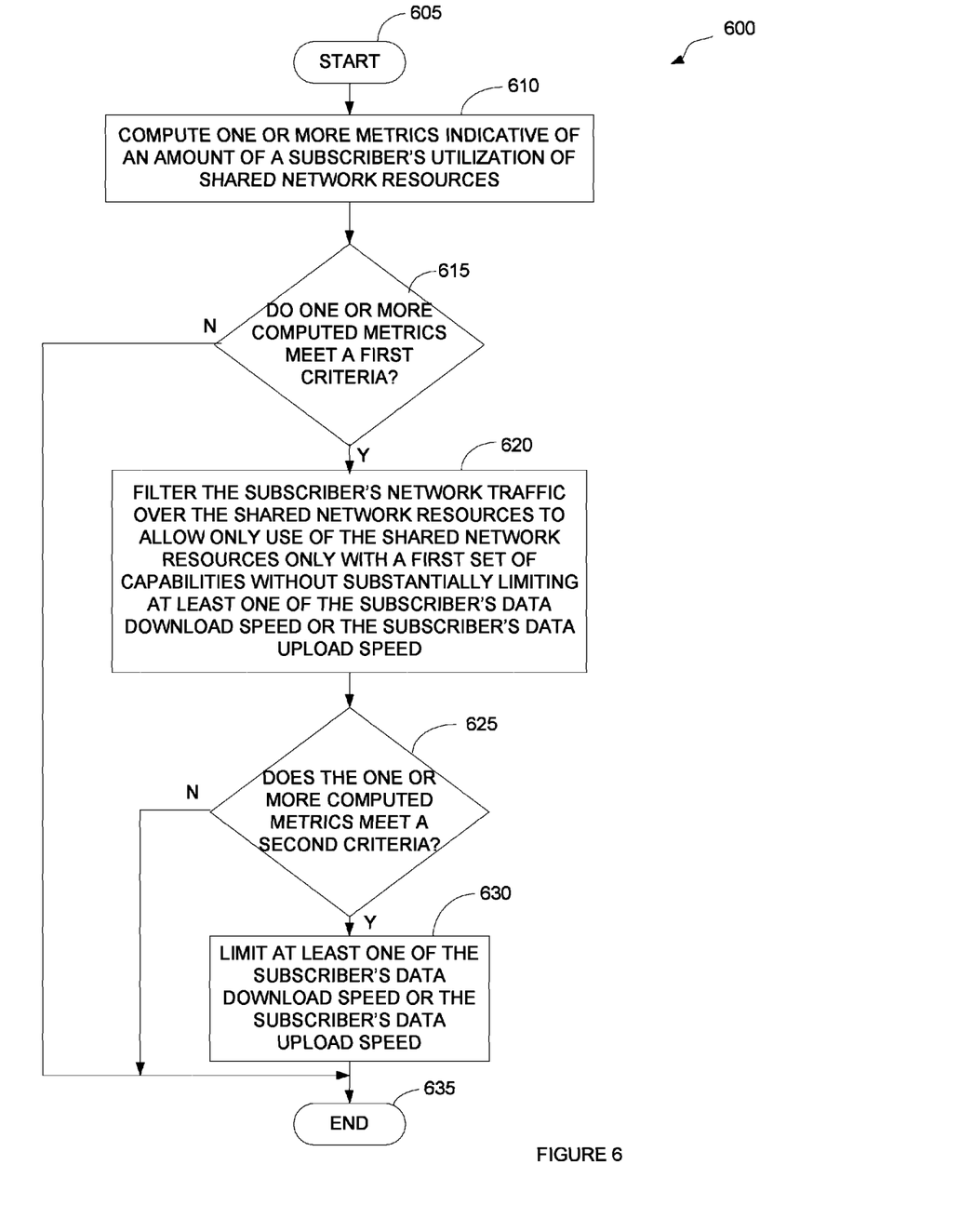
FIG. 6 is a flowchart of a method of managing network utilization.

FIG. 6 is a flowchart of a method of managing network utilization. Process 600 may be implemented by a combination of a firewall, illustrated in FIG. 2, FIG. 3, and FIG. 5, and instructions included in a load manager 310 illustrated in FIG. 3. Instructions in policy program 510 may also implement some or all of process 700.

Process 600 begins at start block 605 and then moves to block 610 where one or more metrics indicative of an amount of a subscriber's utilization of shared network resources are computed. Block 610 may be performed by instructions included in load manager 310 illustrated in FIG. 3.

The one or more computed metrics may be based on subscriber usage statistics reported by the statistics flows illustrated in FIG. 2. Process 600 then moves to decision block 615, where the one or more computed metrics are compared to a first criteria. In some implementations, the first criteria may define one or more thresholds for the one or more computed metrics that collectively determine whether the subscriber is exceeding a usage limit specified by the subscriber's network data access plan. If the subscriber's utilization as described by the one or more computed metrics does not exceed the usage limit described by the first criteria, the one or more metrics will not meet the first criteria in this example.

In some implementations, the first criteria may include exceeding a single threshold. In other implementations, the first criteria may include multiple conditions. For example, the first criteria may include one or more thresholds relating to multiple measurements of a subscriber's utilization. Some thresholds included in the criteria may define limits on a user's utilization of shared network resources within a first time period. Another set of thresholds included in the criteria may define limits on a user's utilization over a second time period. In some implementations, the first time period may be shorter than the second time period.

Some implementations may include metrics and associated criteria that measure the types of subscriber usage during a time period. For example, these implementations may determine a percentage of streaming/real-time data and a percentage of best-effort or non-real-time data sent or received by the subscriber. The composition or type of usage by the subscriber may be represented by one or more metrics that are computed.

Some implementations may include some or all of the measurements and criteria described above. In these implementations, decision block 615 may compare multiple metrics to multiple corresponding thresholds. Any algorithm that analyzes one or more metrics to classify the subscriber's network utilization with respect to a criteria may be used.

In some implementations, a criteria may relate to an amount of network data traffic of N bits transferred between a subscriber terminal and the shared network resources during a time period T. For example, a criteria may relate to the amount of data downloaded from the shared network resources over a time period. Alternatively, a criteria may relate to the amount of data uploaded over the shared network resources during a time period. In yet another implementation, a criteria may relate to the total amount of data both uploaded and downloaded during a time period.

If the one or more computed metrics do not meet the first criteria, process 600 moves to end block 635. If the one or more computed metrics does meet the first criteria, process 600 moves to block 620, where the subscriber's network traffic using the shared network resources is filtered to allow only data associated with a first set of capabilities without limiting at least one of the subscriber's data download speed or the subscriber's data upload speed. For example, the first set of capabilities may be an ability to utilize a first set of network applications, a first set of categories of network content, a first set of network protocols, or a combination of these. Block 620 may be performed by a combination of instructions in load manager 310 and instructions included in the policy program 510 of FIG. 5. For example, to implement block 620, the load manager 310 may specify a firewall policy and send that policy to firewall 280. Policy program 510 may then enforce the policy specified by load manager 310 in order to filter the subscriber's network traffic.

Process 600 then moves to block 625 where the one or more computed metrics is compared to a second criteria. This one or more computed metrics may be the same as or different from the one or more computed metrics used in decision block 615. Block 625 may be performed by instructions included in a load manager 310, illustrated in FIG. 3. The second criteria may represent a second level of usage. This second level of usage may exceed the subscriber's network data access plan in some way. If the one or more computed metrics does not meet the second criteria, then process 600 moves to end block 635. If the one or more computed metrics does meet the second criteria, process 600 moves to block 630, where at least one of the subscriber's data download speed or data upload speed is limited. Block 630 may also be implemented by instructions included in the policy program 510, illustrated in FIG. 5. Process 600 then moves to end block 635.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing modules, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computer implemented method of managing network utilization in a network where a plurality of subscribers using a plurality of subscriber terminals access a set of shared network resources, comprising:
   computing a metric indicative of an amount of a subscriber's utilization of the shared network resources for at least first and second sets of capabilities; and
   filtering, using the shared network resources, network traffic between the shared network resources and the subscriber's terminal to allow use of the shared network resources only for the first set of capabilities based at least in part on the computed metric meeting a first criteria, without limiting at least one of the subscriber's data download speed or the subscriber's data upload speed when the computed metric meets the first criteria.

2. The method of claim 1, further comprising limiting one or both of the subscriber's data download speed or data upload speed based at least in part on the computed metric meeting a second criteria, wherein the first criteria is indicative of a lower subscriber utilization than the second criteria.

3. The method of claim 1, wherein the first set of capabilities comprises an ability to use at least one selected from email applications, web browsing applications, social networking applications, instant messaging applications, and voice over IP applications.

4. The method of claim 1, wherein the first set of capabilities does not comprise an ability to use at least one of real-time entertainment applications, streaming applications, peer to peer sharing applications, file sharing applications, photo and video sharing applications, video calling applications, and file transfer applications.

5. The method of claim 2, wherein the subscriber's data download speed is limited to a speed less than a predefined percentage of a full data download speed.

6. The method of claim 2, wherein the subscriber's data upload speed is limited to a speed less than a predefined percentage of a full data upload speed.

7. The method of claim 1, wherein the first criteria includes an amount of network data traffic of N bits in a window of time T.

8. The method of claim 1, further comprising increasing the amount of usage indicated by the first criteria in response to a change in subscriber's network service plan.

9. The method of claim 1, further comprising resetting one or more counters, wherein the computed metric is based, at least in part, on the one or more counters.

10. The method of claim 7, wherein T is less than 30 days.

11. The method of claim 1, wherein the first set of capabilities comprises an ability to access network content in a first category set and does not include an ability to access network content in a second category set.

12. The method of claim 1, wherein the first set of capabilities comprises an ability to access a category of content from a first set of network applications, but does not comprise an ability to access the category of content from a second set of network applications.

13. The method of claim 1, wherein the shared network resources comprise one or more firewalls and one or more network routing devices, and filtering network traffic between the shared network resources and the subscriber's terminal comprises filtering the network traffic using the one or more firewalls.

14. A system of shared network resources that manage a plurality of subscriber's access using a plurality of subscriber terminals to the shared network resources, comprising:
   means for computing a metric indicative of an amount of a subscriber's utilization of the shared network resources for at least first and second sets of capabilities; and
   shared network resource means for filtering the subscriber's access between the shared network resources and the subscriber's terminal to allow use of the shared network resources only for the first set of capabilities based at least in part on the computed metric meeting a criteria, without limiting at least one of the subscriber's data download speed or the subscriber's data upload speed when the computed metric meets the criteria.

15. A system for managing network utilization in a network where a plurality of subscribers to a data communication service access a set of shared network electronic hardware resources using a plurality of subscriber terminals, comprising:
   at least a portion of the set of shared network resources;
   an application running on the at least a portion of the set of shared network electronic hardware resources, and configured to:
      compute a metric indicative of an amount of a subscriber's utilization of the shared network electronic hardware resources for at least first and second sets of capabilities; and
      filter the subscriber's access of the shared network resources to allow use of the shared network electronic hardware resources only for the first set of capabilities based at least in part on the computed metric meeting a criteria, without limiting at least one of a subscriber's data download speed or a subscriber's data upload speed when the computed metric meets the criteria.

16. The system of claim 15, wherein the network is a satellite network.

17. The system of claim 15, further comprising an uplink transmitter that transmits data from the subscriber terminal.

18. The system of claim 15 further comprising a downlink receiver that receives data sent to the subscriber terminal.

* * * * *